(12) United States Patent
Shattuck et al.

(10) Patent No.: US 9,531,421 B2
(45) Date of Patent: *Dec. 27, 2016

(54) LANYARD

(71) Applicant: Casey Shattuck, Spring Branch, TX (US)

(72) Inventors: Casey Shattuck, Spring Branch, TX (US); Adam Berman, Austin, TX (US); Andrew Frazier, Sunnyvale, CA (US)

(73) Assignee: Casey Shattuck, Spring Branch, TX (US)

(*) Notice: Subject to any disclaimer, the term of this patent is extended or adjusted under 35 U.S.C. 154(b) by 10 days.

This patent is subject to a terminal disclaimer.

(21) Appl. No.: 14/739,892

(22) Filed: Jun. 15, 2015

(65) Prior Publication Data

US 2015/0280764 A1  Oct. 1, 2015

Related U.S. Application Data

(63) Continuation of application No. 13/618,030, filed on Sep. 14, 2012, now Pat. No. 9,059,777.

(60) Provisional application No. 61/535,107, filed on Sep. 15, 2011.

(51) Int. Cl.
| | |
|---|---|
| *H04B 1/38* | (2015.01) |
| *H04B 1/3827* | (2015.01) |
| *H04M 1/05* | (2006.01) |
| *H04M 1/60* | (2006.01) |
| *H04B 1/3877* | (2015.01) |

(52) U.S. Cl.
CPC ............ *H04B 1/385* (2013.01); *H04B 1/3877* (2013.01); *H04M 1/05* (2013.01); *H04M 1/6058* (2013.01)

(58) Field of Classification Search
CPC .............................. H04B 1/385; H04B 1/3877
USPC .... 455/575.1, 575.2, 575.6, 90.3; 340/568.1, 340/539.11; 224/257
See application file for complete search history.

(56) References Cited

U.S. PATENT DOCUMENTS

| | | |
|---|---|---|
| D534,065 S | 12/2006 | Andre |
| D562,807 S | 2/2008 | Andre |
| D566,691 S | 4/2008 | Andre |
| D577,990 S | 10/2008 | Andre |
| 7,650,007 B2 | 1/2010 | De Iuliis |
| 8,004,406 B2* | 8/2011 | Bleckmann et al. ...... 340/568.1 |
| 2010/0133307 A1* | 6/2010 | Martin et al. ................. 224/257 |
| 2012/0105223 A1* | 5/2012 | Weil ........................ 340/539.11 |

OTHER PUBLICATIONS

Lanskin, "Lanskin Lanyard Executive Case for iPhone and iPod," Sep. 14, 2012, 1 page.
Amason, "Case-Mate CM015575 ID Credit Card Slim Case for iPhone 4/4S Pink," Sep. 14, 2012, 5 pages, Amazon.
Amazon, "Apple iPod Lanyard Headphones for iPod Nano 1G," Sep. 14, 2012, 6 pages.
Accessory Geeks, "Original iCat Neck It Apple iPhone/iPod Lanyard Strap Holder with Detachable Buckle, 11016C-106—Turquoise," Sep. 14, 2012, 3 pages.

* cited by examiner

*Primary Examiner* — John J Lee
(74) *Attorney, Agent, or Firm* — Trop, Pruner & Hu, P.C.

(57) ABSTRACT

Various embodiments relate generally to a mobile device (e.g., cellular phone) case and neck lanyard (with integrated headphones and microphone) allowing hands-free use of the mobile device. An embodiment magnetically couples the case to the lanyard. Other embodiments are described herein.

18 Claims, 10 Drawing Sheets

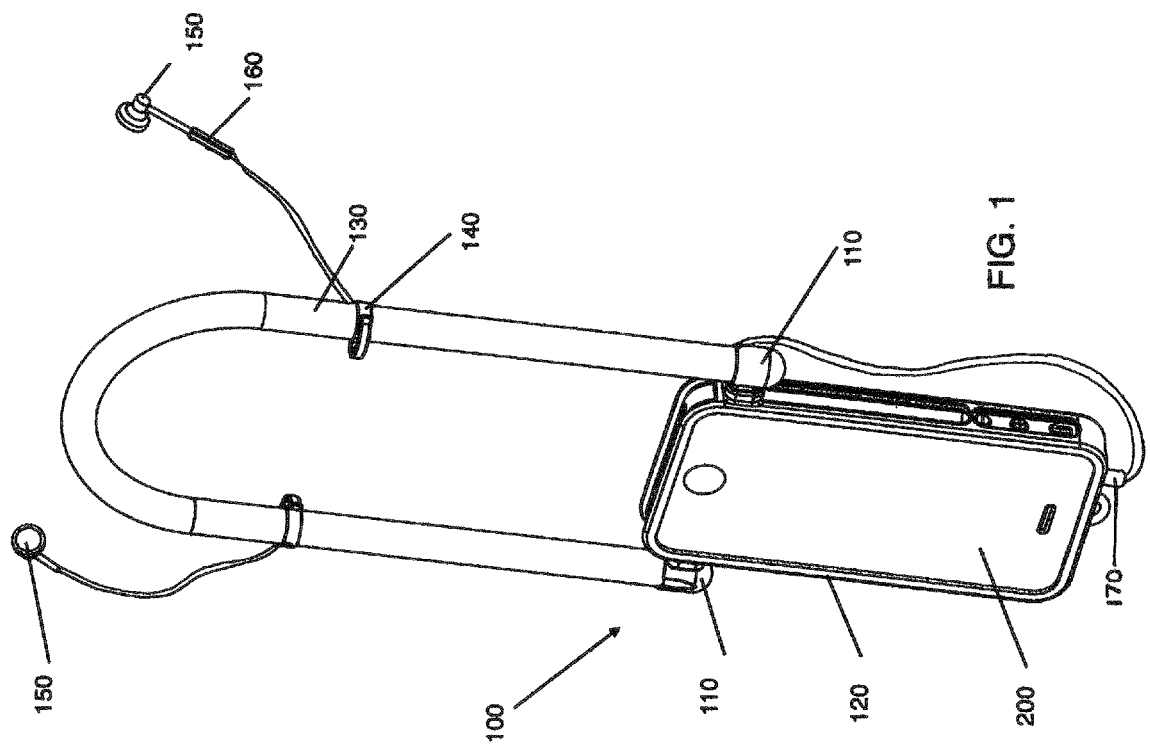

LANYARD

This application is a continuation of U.S. patent application Ser. No. 13/618,030, filed Sep. 14, 2012 and entitled "Lanyard", which claims priority to U.S. Provisional Patent Application No. 61/535,107 filed on Sep. 15, 2011 and entitled "Lanyard". The content of these applications is hereby incorporated by reference.

BACKGROUND

Conventionally, using a wired headphone/microphone combination to place or receive phone calls with a mobile phone requires the user to either hold the phone in his or her hand or route the wires for the headphones/microphone through his or her clothing in order to stow the phone in a pocket or purse. When the user holds the phone in his or her hands, it hinders the user's ability to perform other tasks. Moreover, stowing the phone in a pocket can be inconvenient if the user wants to manipulate the phone's controls, view the phone's video screen, or use the camera.

BRIEF DESCRIPTION OF THE DRAWINGS

Features and advantages of embodiments of the present invention will become apparent from the appended claims, the following detailed description of one or more example embodiments, and the corresponding figures, in which:

FIG. 1 includes a perspective view of an embodiment of the invention.

DETAILED DESCRIPTION

Figure 3:
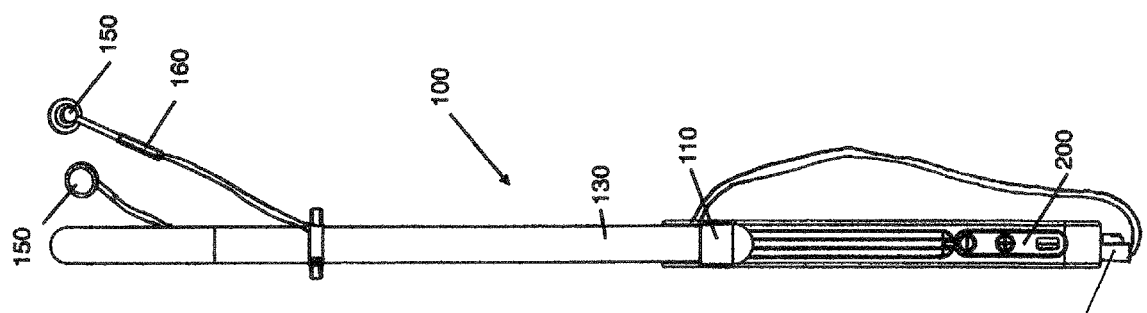
FIG. 3 includes a side view of an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

Various embodiments relate generally to a mobile device (e.g., cellular phone) case and neck lanyard with integrated headphones and microphone allowing hands-free use.

With internet-capable "Smartphones" playing an integral role in daily life for users of all ages, there have been numerous accessories that have been developed to facilitate carrying, transporting, using and protecting these devices. Several categories of Smartphone accessories have been developed and are described below.

First, manufacturers make removable cell phone/Smartphone cases that serve the primary purpose of protecting the phone from being damaged during daily use. These cases are typically fabricated out of soft or semi-rigid plastic, with the goal of protecting the phone from physical impact (e.g., crushing, bumping, scraping) while maintaining a low profile and allowing the user to insert the phone and its respective case into their pocket, purse, briefcase or attaching it to a belt clip or holster to facilitate transportation. While these cases generally serve the purpose of protecting the phone against some damage, they are often cumbersome to the user, as they create an overall larger device, while requiring the user to continuously remove the phone from their pocket, purse, belt clip or holster during use. Constant removal and replacement into user's pocket, purse, belt clip or holster can result in lost or damaged phones, while making it difficult for the user to routinely access the Smartphone.

Second, headphones and headphone-microphone headset combinations are available in the marketplace that connect to the Smartphone allowing the user to listen to music, talk on the phone, or record audio notes. Typically, these wired headphones require the user to route the wires using a clip or fastener to attach the wire to the user's clothing, thereby attempting to control the path of the wire between the phone and the user. This is often cumbersome as the wire remains unfixed, allowing excessive motion of the microphone and introducing excessive background noise. A user walking or running with a wired headset will often snag the wire on an object, ripping the headset away from the user and sometimes damaging the headphone cord, phone or even causing injury to the user.

By using a standard wired headphone-microphone combination there are several key problems: (1) accidental dislodging of wire, headset and microphone causing damage to headset, phone and possibly injuring user; (2) unsecure routing of the wire between user and phone may result in unintended background noise and may reduce overall call quality; and (3) these wire headsets typically require separate storage cases, or will be wound without a case during storage, leaving them subject to damage during transport and connection and disconnection form the Smartphone. However, there is also a very important benefit of using a wired headphone-microphone combination: minimized exposure of electromagnetic radiation to the Smartphone user. Holding a Smartphone to your ear, in close proximity to the brain for long periods of time during phone conversations, may have a negative health impact. Electromagnetic radiation data exponentially lowers with increasing distance from the Smartphone. Utilizing a wired headset and microphone combination allows the user to keep the phone away from the brain during prolonged conversations but does not mitigate the problems described above: accidental dislodging of wire, unsecure routing of wire, unintended background noise, and difficulty in storing the wired headsets.

Various wireless headphone/microphone use Bluetooth technology. The purpose of these headsets is to minimize the hassles associated with using wired headset/microphone combinations described above. These devices mitigate the challenges of wire routing (e.g., accidental dislodging of wired connectors into the Smartphone) but they introduce several significant problems to the user: (1) they have poor sound quality, (2) these devices often have poor sound quality due to the fact that they are an additional wireless communication system prone to interference, and (3) wireless headphones can deliver high doses of electromagnetic radiation to the user. While these devices prevent the user from the requirement of holding the phone against their ear, they are wireless electromagnetic radiation-generating systems that continuously emit electromagnetic radiation in immediate proximity to the user's brain. Also, these devices are not always secured properly to the ear of the user, making them prone to loss, damage or ineffective implementation. Further, these devices must be recharged separately from their respective phones, and require additional battery power. Also, compatibility can be challenging between the various model Smartphones and wireless headsets An embodiment of the invention includes a lanyard. Lanyards facilitate transportation of ID badges and audio devices. They are simple plastic or fabric assemblies that allow the user to carry an object around their neck without requiring use of one's hands. These lanyards serve to facilitate transportation and display of certain devices.

An embodiment of the invention integrates novel Smartphone case and headphone/microphone system features with the goal of empowering the user to operate their Smartphone in a true "hands-free" mode. This will allow a user to talk on the phone, listen to music, record video and/or audio while carrying their Smartphone on their person implementing a wired headphone-microphone system with ease. This also allows the user to minimize his or her brain exposure to potentially harmful electromagnetic radiation by allowing the user to keep the phone more than 12" away from the brain, and completely eliminate the need for a wireless (Bluetooth) headset that may also emit potentially harmful electromagnetic radiation to the brain. Other advantages include protecting the phone (minimizing the potential damage to the phone by allowing the user to continuously carry the phone without removing and replacing the phone from their pocket or purse). In addition, embodiments help maintain Smartphone accessibility. Further, an embodiment optimizes conversation quality by minimizing background noise caused by microphone motion and dislodging with traditional wired headsets. An embodiment facilitates using 2 earphones, optimizing audio quality. Further, an embodiment allows a user to safely carry the phone and safely remove the phone with an integrated safety release mechanism. Embodiments also allow branding opportunities via, for example, screen-printing on the system.

An embodiment integrates: (1) novel Smartphone case design, (2) novel wired headphone-microphone combination design, and (3) novel connection and disconnection between the wired headphone and Smartphone case system.

Referring to FIGS. 1-5, shown is an embodiment including a case/lanyard system 100. The case/lanyard system is comprised of a phone case 120 surrounding a phone 200, and a neck lanyard 130 with integrated headphones 150 and microphone 160. The lanyard and case can be releasably attached by bringing the lanyard-end housing 110 into alignment with the case-connector housing 125. In some embodiments, a magnet 115 inside the lanyard-end housing 110 is attracted to a small piece of magnetic metal 112 inside the case-connector housing 125. In an embodiment the case-to-lanyard connection may further be strengthened by a protrusion 126 on the lanyard-end housing that inserts into the case-connector housing, thus restricting 1 or more axes of motion between the case and lanyard.

In some embodiments the case 120 is designed to protect the phone from damage and is thus made of rigid, flexible, or a combination of rigid and flexible materials such as polycarbonate, metals, urethane, silicone, or many other materials or combination of materials as know to those skilled in the art. Similarly the lanyard-end housing 110 and case-connector housing 125 may be comprised of rigid and flexible materials such as polycarbonate, metals, urethane, silicone, or many other materials or combination of materials as known to those skilled in the art.

In some embodiments, the lanyard 130 may be comprised of materials that provide comfort for the wearer while being strong enough to secure the phone during vigorous movement. As such, the lanyard may be comprised of flexible materials such as silicone, urethane or elastic fabric. Furthermore, in some embodiments the lanyard may be comprised of differing materials along its length. For example, the lanyard may be comprised of silicone where it contacts the user's neck and a more rigid material such as nylon closer to the lanyard-end connector. Additionally, in some embodiments the lanyard may be comprised of combinations of materials such as silicone molded over nylon, providing both comfort and strength In order to route the headphone and microphone wires from the user to the phone 200, the lanyard 130 may have one of many cross-sections allowing the wires to be constrained within or on the lanyard. In some embodiments the lanyard has as fully enclosed lumen such as a tube and in other embodiments the lanyard has externally located concavities that accept the headphone and microphone wires.

Figure 2:
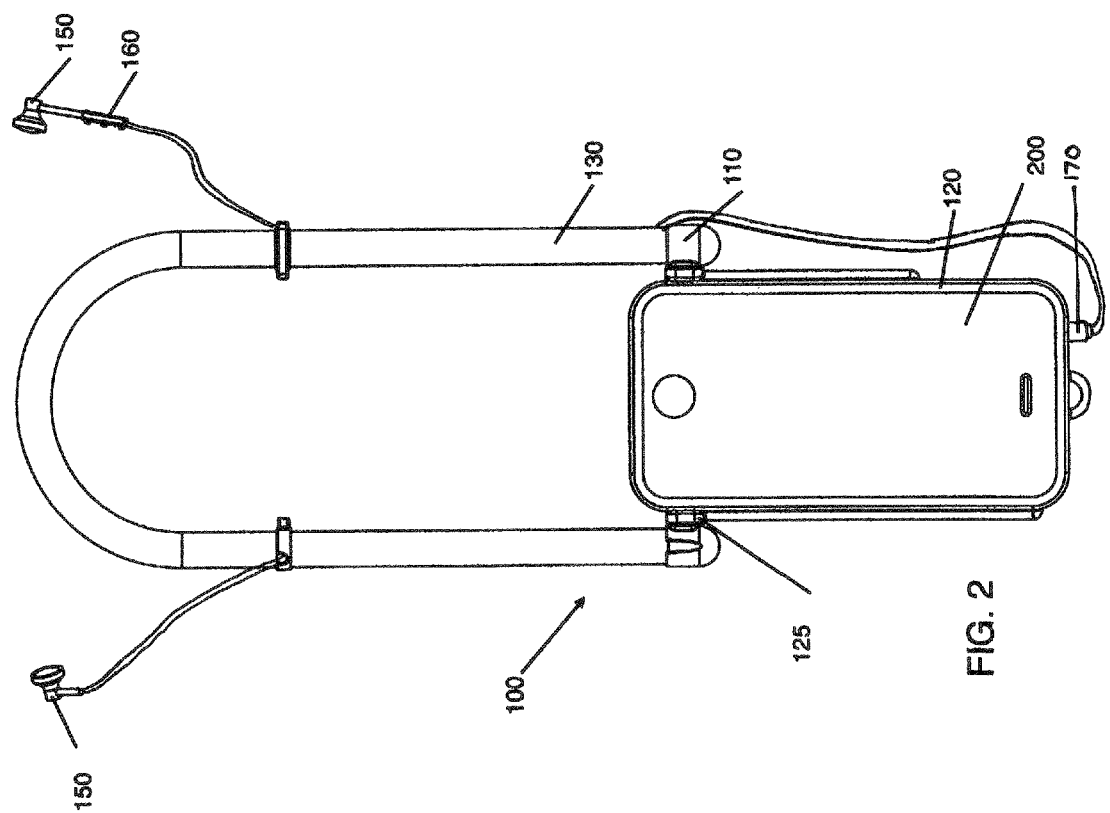
FIG. 2 includes a front view of an embodiment of the invention.
Figure 4:
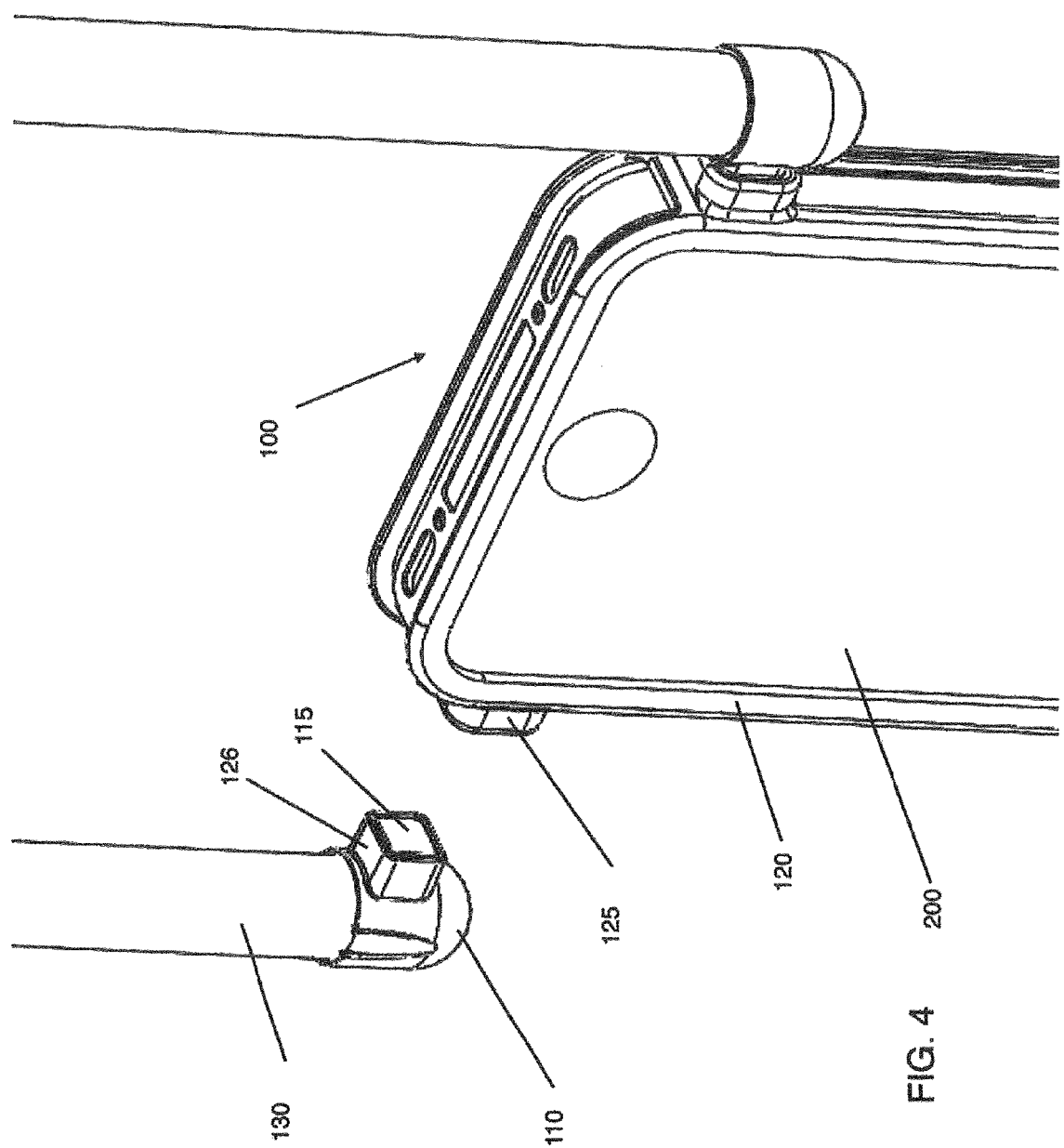
FIG. 4 includes a perspective view of a lanyard/mobile device junction in an embodiment of the invention.
Figure 5:
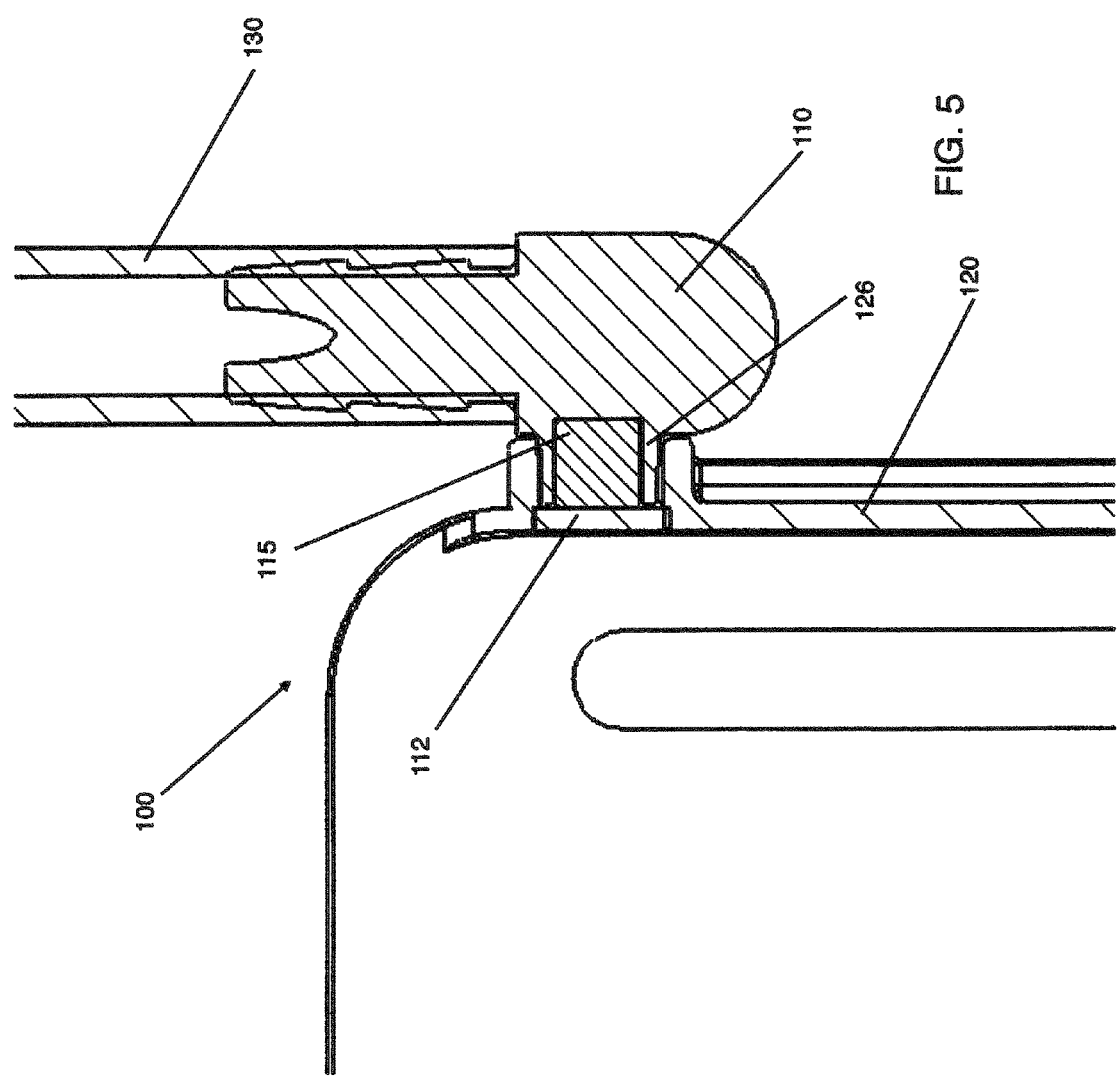
FIG. 5 includes a front cross-section view of a lanyard/mobile device junction in an embodiment of the invention.
Figure 6:
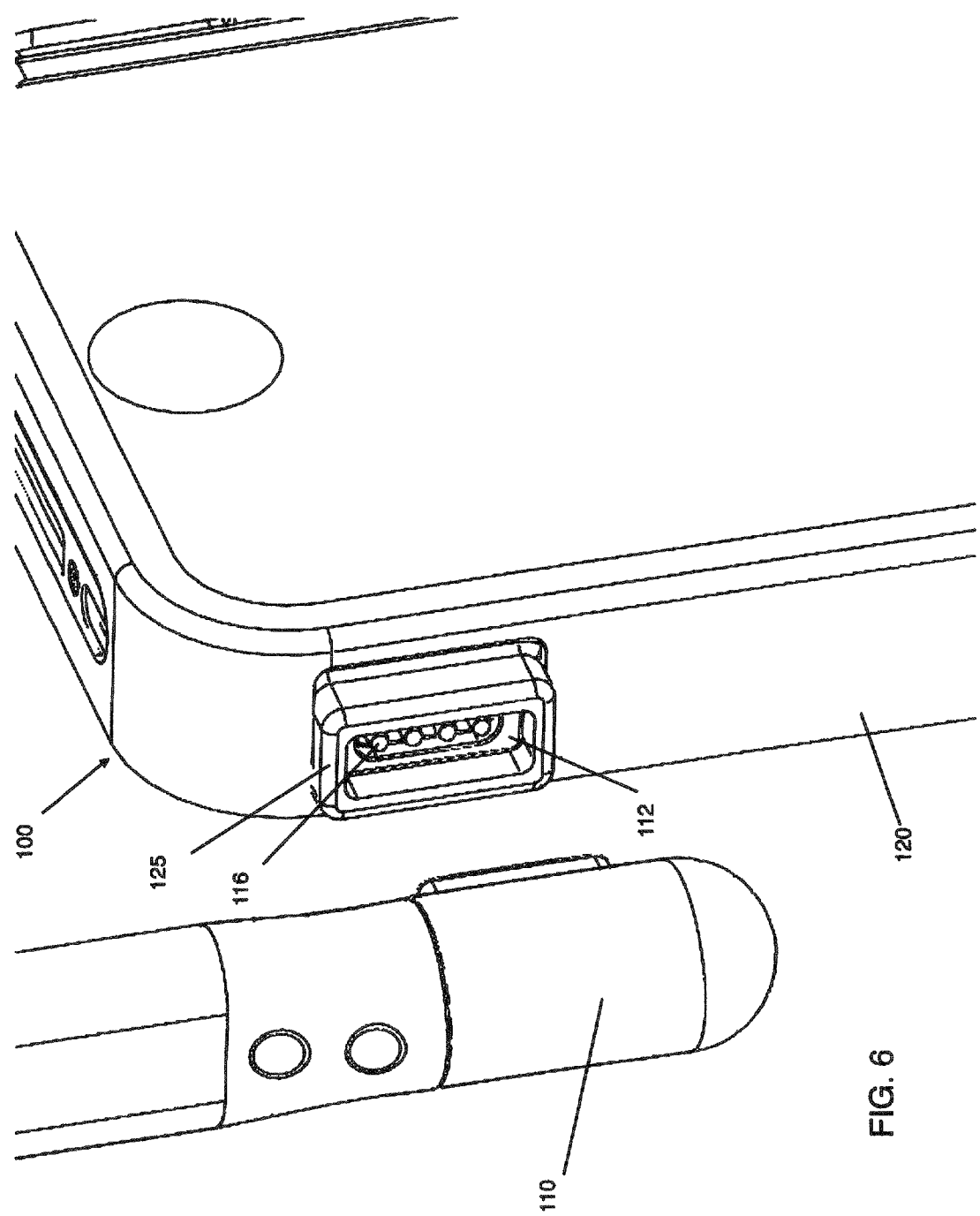
FIG. 6 includes a perspective view of a lanyard/mobile device junction in an embodiment of the invention.
Figure 7:
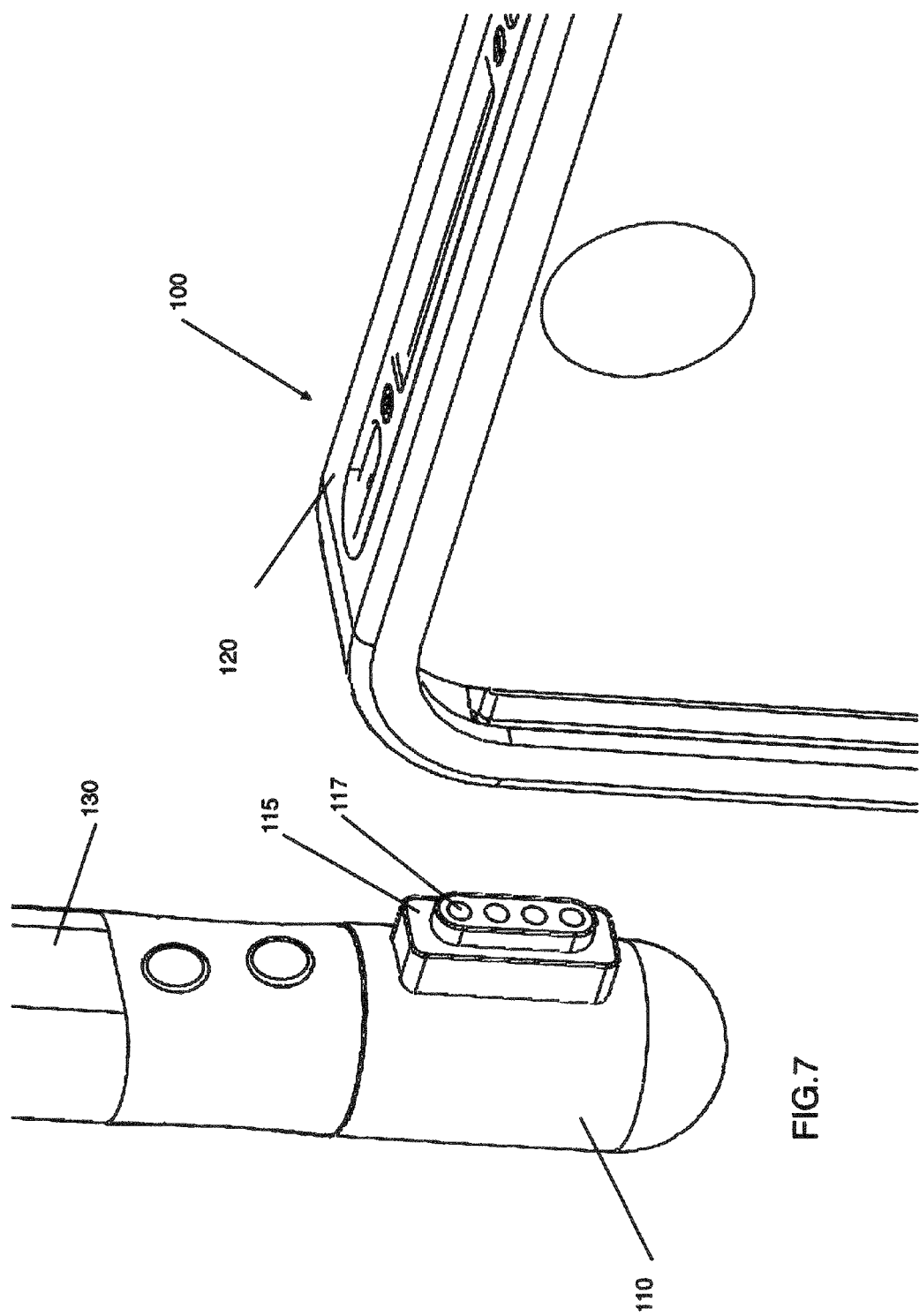
FIG. 7 includes a perspective view of a lanyard/mobile device junction in an embodiment of the invention.

As shown in FIGS. 1-3, in some embodiments the headphone and microphone wires enter the lanyard near the user's neck and are routed down one side of the lanyard, exiting the lanyard near the lanyard-end housing 110. The headphone and microphone jack 170 (audio connector) may be attached to the audio connector on the phone by the user. FIG. 1 shows headphone cables entering the lanyard near element 140, exiting near the ends of the lanyard, and then interfacing the phone via jack 170. Jack 170 may be permanently coupled to the headphones 150, the case 120, the phone 200, or may be separably coupled to any of headphones 150, case 120, and phone 200.

Additionally shown in FIGS. 1-4, small elastic or deformable protrusions 140 may be included on the lanyard a varying positions to allow the user to capture the headphones or microphone when not in use, preventing them for swaying or getting caught on nearby objects.

Referring to FIGS. 6-10, in other embodiments the headphone and microphone wires enter the lanyard near the user's neck, are routed down one side of the lanyard, and are connected to a lanyard audio connector 117 in the lanyard-end housing 110. The lanyard audio connector 117 may be releasably connected to a mating case audio connector 116 in the case-connector housing 125. In order to complete the electrical connections from the headphone wires to the phone, the case audio connector 116 is connected to wires that run through the case to a headphone and microphone jack 170. The headphone and microphone jack 170 is positioned in the case such that when the phone is inserted into the case, the jack 170 engages the phone's female audio connector receptacle.

Further referring to FIGS. 6-10, in some embodiments, magnetic connectors 115 and 112 are placed in the lanyard-end housing 110 and case-connector housing 125 respectively, such that magnetic attraction facilitates the mating of the lanyard audio connector 117 and case audio connector 116. It should be noted that of the two lanyard-end housing to case-connector housing connections in the system 100, one may include only a mechanism for releasably attaching the lanyard to the case such as magnets 115 and 112, but may or may not include the audio connectors 117 and 116. In other embodiments both left and right lanyard-to-case connections have audio connecting circuitry.

In one or more embodiments, the lanyard audio connector 117 and case audio connector 116 are comprised of conductive metals such as gold, nickel, steel, and the like. In some embodiments, the lanyard audio connector has female receptacle conductors that accept the corresponding male plug conductors on the case audio connector 116. Many other connectors are envisioned such as simple flat plates that contact to each other by way of the magnetic forces provided by the magnetic connectors 115 and 112. Female receptacles with spring-loaded conductors that deform and provide ample conduction with tapered plugs comprise another embodiment. In all embodiments, each of the connector conductors is isolated from the other connector conductors within the connector in order to maintain separation of the individual current pathways. The conductor insulation may include materials such as silicone, polyester, nylon, polyolefin or many other insulators as known to those skilled in the art.

The individual current pathways provided by the conductor wires in both the case and the lanyard are maintained through lanyard/case junction by way of the mechanisms described above. In one or more embodiments, the conductor wires channels leading from the phone to the headphones and microphone may include: right headphone input, left headphone input, microphone output, and a common ground for all inputs and outputs. Other channel configurations are envisioned and may be influenced by the input/output channels of the phone itself, for instance, individual grounds for each channel and or single channel audio output for a single headphone.

Figure 8:
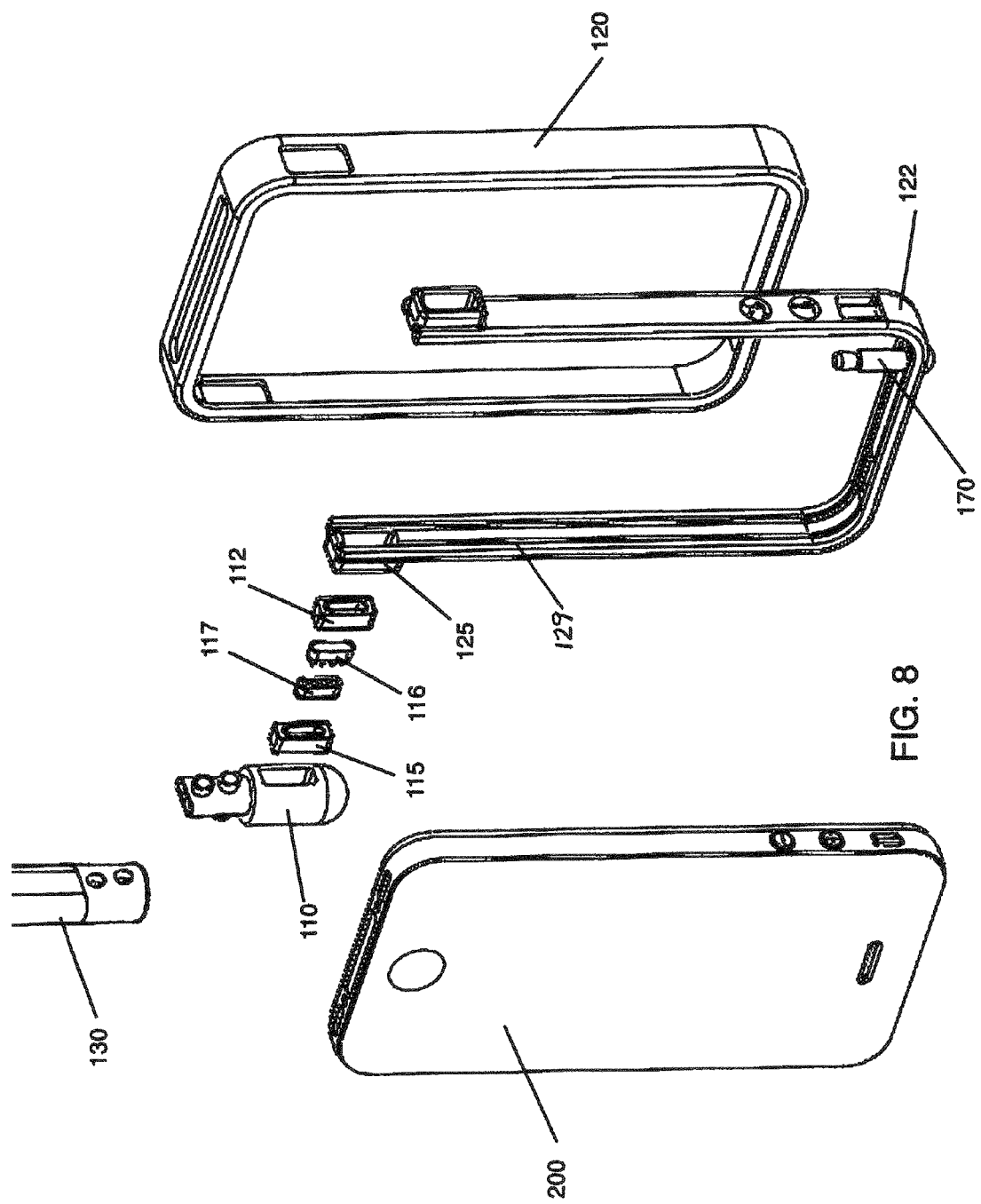
FIGS. 8-9 include exploded views of a lanyard/mobile device system in an embodiment of the invention.
Figure 9:
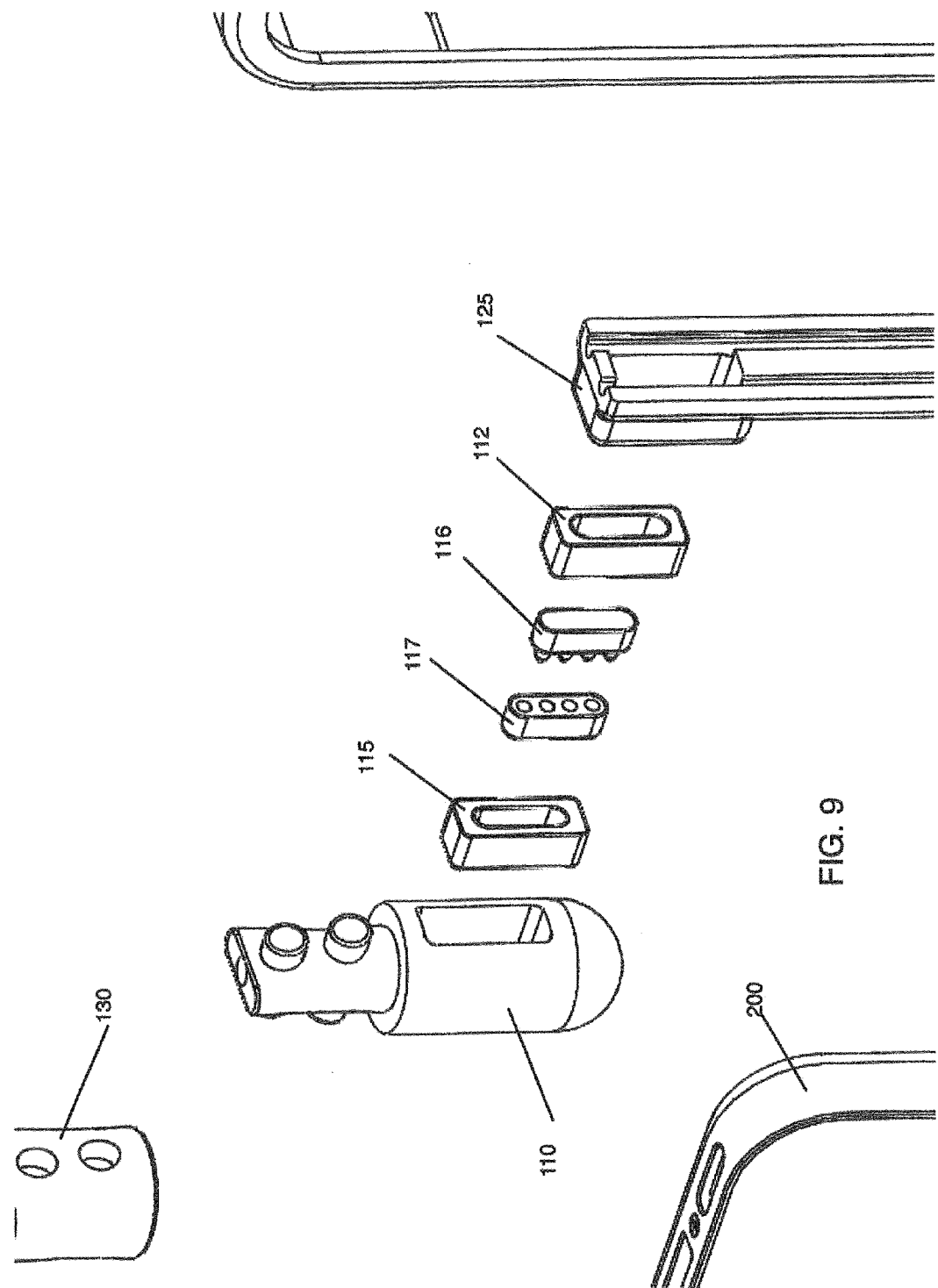
Figure 10:
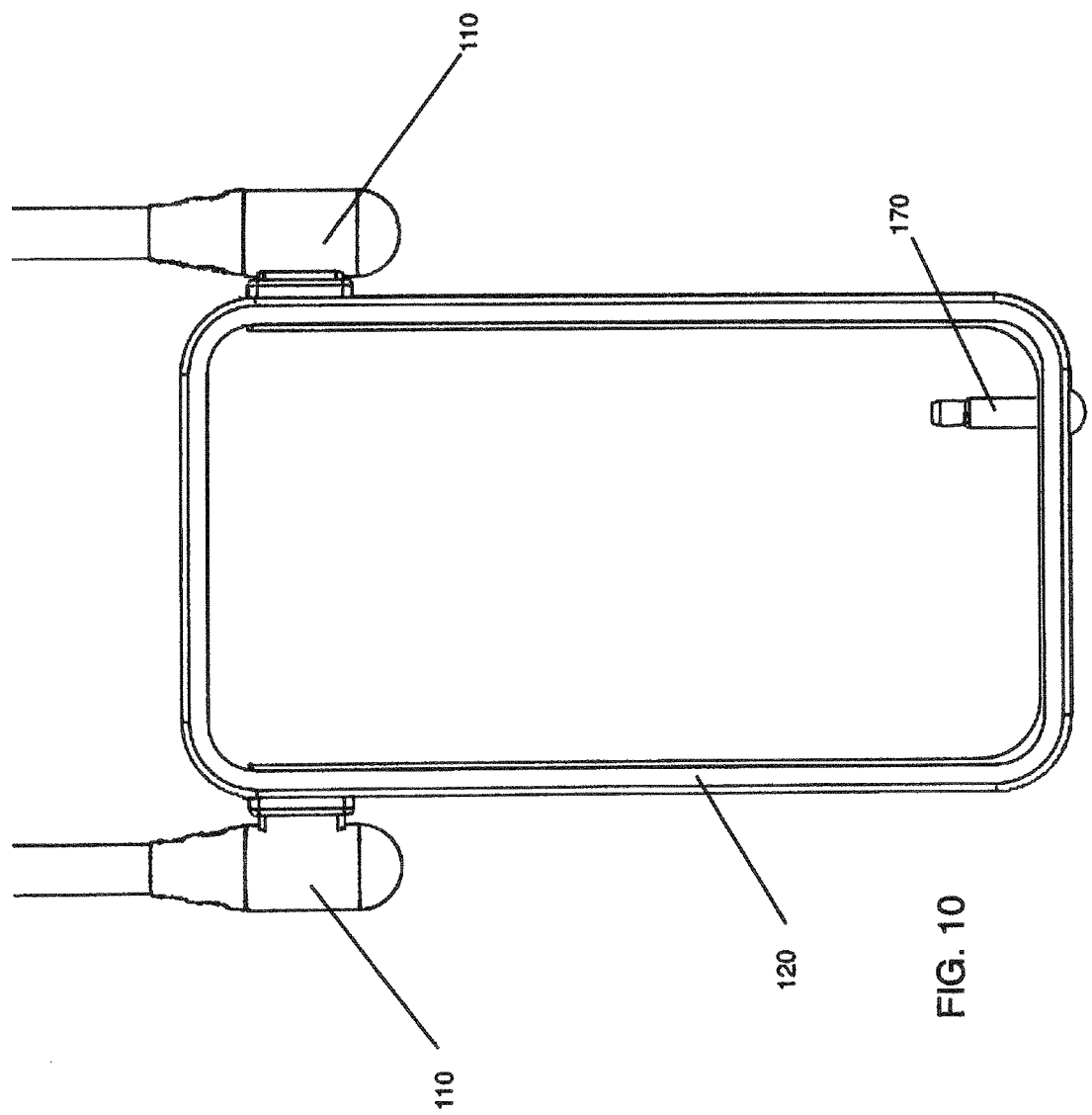
FIG. 10 includes a front view of an embodiment of the invention.

As shown in FIG. 8, the phone 200 may be enclosed by a combination of external phone case 120 and internal case structure 122. The case current/signal interconnect 129 electrically couples the case audio connector 116 to the headphone and microphone jack 170 (or any other jack or node of interest). Interconnect 129 may be an integral part of the phone case 120 and/or internal case structure 122. In an embodiment, a signal (e.g., audio, current, and the like) may traverse an interconnect that is fully or partially enclosed within phone case 120 and/or 122. This partial enclosure may just cover or conceal a single surface of the interconnect which is on the surface of case 120 and/or 122. Combinations of internal, external, and surface located interconnects are also included in various embodiments.

Figure 11:
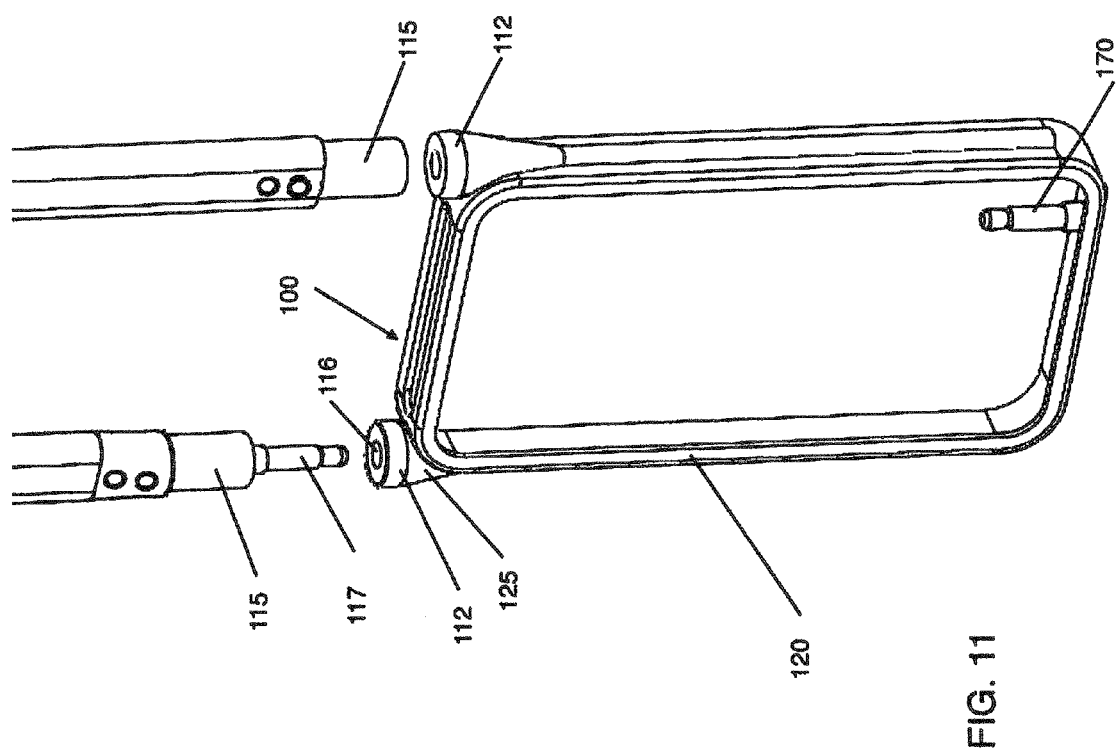
FIG. 11 includes a perspective view of an embodiment of the invention.

As shown in FIG. 11, magnetic connectors 115 and 112 and audio connectors 117 and 116 may also be configured coaxially with the length of the lanyard. As with the embodiments shown in FIGS. 6-10, conductor wires running within the case 120 from the audio connector 116 to the audio connector jack 170 would complete the electrical connections between the headphones 150 and microphone 160 to the phone 200.

In further embodiments, the lanyard may be connected to the case with a combination of mechanical and magnetic mechanisms. This may include mechanical locks such tongue and grooves friction fit connectors, o-ring and groove connectors, and many others as known to those skilled in the art.

Embodiments include different combinations of components comprising the magnetic connections envisioned for use in this invention including: rare earth magnets such as neodymium-boron-iron in conjunction with ferritic metals, rare earth magnets in conjunction with oppositely poled rare earth magnets, and/or electromagnets powered by the user's phone or auxiliary battery source. In some embodiments the strength of the magnet may be 52 Mega Gauss Oersteds (also referred to as N52 strength), but many other strengths may be used such as N42 and the like.

In other embodiments, accelerometers are mounted in the lanyard or case, and connected via circuitry to electromagnets powered by the user's phone or auxiliary battery source. If an acceleration limit is reached and deemed unsafe for the user, the electromagnet power is reduced, thereby allowing the lanyard to easily disconnect from the case at a low force. However, in other embodiments higher accelerometer readings (e.g., during jogging) may increase the current and magnetic attraction. Of course this embodiment may include an upper limit at which time current is reduced to allow the magnetic coupling to decouple. In one embodiment, a magnetic coupling may be decoupled via a grounding circuit such that when a user touches the magnet (possibly directly touching the magnet by withdrawing a protective layer or cover from the magnet) electromagnetic inducing current is grounded, reducing the energy supplied to the magnet, and triggering a reduction in the required separation force between the magnets in the protective case and the lanyard.

In accordance with one or more embodiments, the user may use the following method to utilize the invention. First, the user secures the phone in the case. The user can then attach the lanyard ends to the case. Once attached, the lanyard can be placed over the user's head and allowed to hang from the neck. As necessary, the user may use their hand or hands to lift and rotate the phone into a viewable angle. At any time, the user may place the headphones in their ears, thus orienting the microphone near the mouth. The user may then place calls, listen to media, or utilize any other phone function with or without holding the phone in their hand or hands. If the user wishes to store the phone, the lanyard ends may be disconnected from the case and stored separately.

A mobile communications device includes, for example, a DVD player that communicates video to a user, cell phone, Smartphone, tablet, Ultrabook, notebook, personal digital assistant, and the like.

Thus, an embodiment includes a system comprising: a lanyard including a lanyard junction end that has a first magnetic element (e.g., metal, magnet, material that can deliver a magnetic charge, a material that can be attracted to a magnetic charge); a headphone coupled to an audio cable, at least a portion of the audio cable to be included within the lanyard (e.g., within a clip, channel, tunnel, hook and circle banding (Velcro), and the like) and the audio cable further including an audio cable junction end (e.g., element 117) generally coterminous with the lanyard junction end (e.g., element 110) when the audio cable is included with the lanyard; and a case to contain a mobile communications device (e.g., DVD player, Smartphone), the case including a case junction end (e.g., element 125) having a second magnetic element (e.g., element 112); wherein the first magnetic element magnetically couples to the second magnetic element when the lanyard junction end couples to the case junction end. In an embodiment the case includes an audio interconnect (e.g., a cable, a ribbon, any conductive material that communicates a signal from point to point) having an audio interconnect junction end (e.g., element 116) generally coterminous with the case junction end. In an embodiment the audio interconnect junction end couples to the audio cable junction end (e.g., see 4 nodes of element 116 surrounded by element 112). In an embodiment wherein the audio cable junction end includes one of a male node and a female node and the audio interconnect junction end includes a node that is physically complimentary to the one of the male node and the female node. For example, in FIG. 6 male nodes 116 couple to female nodes located in 110. In an embodiment the audio interconnect junction end includes one gender neutral node and the audio cable junction end includes a gender neutral node to couple to the gender neutral node of the audio interconnect junction end. For example, the nodes may be flat or lack a resistance fit between the two so the system is mainly reliance on magnetic coupling to keep the two nodes together.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a lanyard including a lanyard junction end that has a first magnetic element;
a headphone coupled to an audio cable, at least a portion of the audio cable to be included within the lanyard and the audio cable including an audio cable junction end generally coterminous with the lanyard junction end when the audio cable is included with the lanyard;
an audio interconnect; and
a case to contain a mobile communications device, the case including a case junction end having a second magnetic element;
wherein the first magnetic element is configured to magnetically couple to the second magnetic element when the lanyard junction end couples to the case junction end.

2. The system of claim 1, wherein the audio interconnect has an audio interconnect junction end.

3. The system of claim 2, wherein the audio interconnect junction end is configured to couple to the audio cable junction end.

4. The system of claim 3, wherein the audio cable junction end includes one of a male node and a female node and the audio interconnect junction end includes a node that is physically complimentary to the one of the male node and the female node.

5. The system of claim 3 including an accelerometer.

6. The system of claim 5 including a current source, wherein (a) the current source is to supply current to one of the first and second magnetic elements at a current level in response to an output signal from the accelerometer; and the (b) current source is one of self powered and powered from the mobile communications device.

7. The system of claim 3, wherein the audio interconnect junction end includes one gender neutral node and the audio cable junction end includes a gender neutral node to couple to the gender neutral node of the audio interconnect junction end.

8. The system of claim 3, wherein (a) the audio interconnect junction end includes a flat faced node and the audio cable junction end includes an additional flat-faced node to directly connect to the flat faced node, and (b) the first magnetic element includes one of a magnet and a metal and the second magnetic element includes another of a magnet and a metal.

9. A system comprising:
a lanyard, including a lanyard junction end having a first magnetic element, configured to couple to a lanyard audio interconnect; and
a case to contain a mobile communications device, the case including a case junction end having a second magnetic element;
wherein the first magnetic element magnetically couples to the second magnetic element when the lanyard junction end couples to the case junction end.

10. The system of claim 9, wherein the case includes a case audio interconnect having a case audio interconnect junction end.

11. The system of claim 10, wherein the case audio interconnect junction end is to couple to a lanyard audio interconnect junction end of the lanyard audio interconnect.

12. The system of claim 10 to couple to an accelerometer.

13. The system of claim 12, wherein one of the first and second magnet elements is to couple to a current source to receive current and provide magnetic attraction at a current level in response to an output signal from the accelerometer.

14. The system of claim 12, wherein the first magnetic element includes one of a magnet and a metal and the second magnetic element includes another of a magnet and a metal.

15. A system comprising:
a lanyard including a lanyard junction end and a means for coupling to an audio cable;
a mobile communications device case including a case junction end; and
a means for magnetically coupling the lanyard junction end to the case junction end.

16. The system of claim 15 including a means for communicating audio between the lanyard junction end and the case junction end.

17. The system of claim 16 including means for supplying current, to the means for magnetically coupling, in response to movement experienced by the system.

18. The system of claim 17 wherein the means for supplying current includes an accelerometer coupled to the system.

* * * * *